US005966296A

United States Patent [19]

Sullivan et al.

[11] Patent Number: 5,966,296

[45] Date of Patent: Oct. 12, 1999

[54] BIPOLAR-DUTY CYCLE CONTROLLABLE DC CORONA POWER SUPPLY

[75] Inventors: Edward J Sullivan, Fairport; John P Marcelletti, Rochester, both of N.Y.

[73] Assignee: Eastman Kodak Company, Rochester, N.Y.

[21] Appl. No.: 08/671,461

[22] Filed: Jun. 27, 1996

[51] Int. Cl.[6] .................... H02M 3/335

[52] U.S. Cl. .................... 363/16; 363/131

[58] Field of Search .................... 363/16, 23, 95, 363/131, 40, 41

[56] References Cited

U.S. PATENT DOCUMENTS

| | | | |
|---|---|---|---|
| 3,617,836 | 11/1971 | Henry | 318/171 |
| 3,999,100 | 12/1976 | Dendy et al. | 315/308 |
| 4,166,690 | 9/1979 | Bacon et al. | 355/3 CH |
| 4,339,732 | 7/1982 | Kesarwani | 331/109 |
| 4,614,998 | 9/1986 | Rilly | 363/16 |
| 5,255,179 | 10/1993 | Zekan et al. | 363/133 |
| 5,361,196 | 11/1994 | Tanamachi et al. | 363/41 |

*Primary Examiner*—Adolf Berhane
*Attorney, Agent, or Firm*—Lawrence P. Kessler

[57] ABSTRACT

A power supply adapted for use with a corona charger. The power supply includes a first DC power source providing an electrical potential above a predetermined reference potential, and a second DC power source providing an electrical potential below such predetermined reference potential. A main circuit having an output adapted to be connected to a corona charger, includes a switching circuit for selectively turning the first and second DC power sources on and off in a manner so as to provide a an electrical potential having an AC waveform output for the main circuit.

8 Claims, 2 Drawing Sheets

BIPOLAR-DUTY CYCLE CONTROLLABLE DC CORONA POWER SUPPLY

BACKGROUND OF THE INVENTION

The present invention relates in general to power supplies for reproduction apparatus corona chargers, and more particularly to a bipolar-duty cycle controllable DC corona power supply wherein simulation of AC charging is accomplished by using two DC power supplies acting in tandem to produce the alternate portions of the AC cycle.

In typical commercial electrostatographic reproduction apparatus (copier/duplicators, printers, or the like), a latent image charge pattern is formed on a uniformly charged charge-retentive or photoconductive member having dielectric characteristics (hereinafter referred to as the dielectric member). Pigmented marking particles attracted to the latent image charge pattern to develop such image on the dielectric member. A receiver member is then brought into contact with the dielectric member, and an electric field applied to transfer the marking particle developed image to the receiver member from the dielectric member. After transfer, the receiver member bearing the transferred image is transported away from the dielectric member, and the image is fixed (fused) to the receiver member by heat and pressure to form a permanent reproduction thereon.

Such reproduction apparatus frequently utilize a corona charger with a grid to apply the initial uniform charge to the photoconductor. The power supply to the gridded corona charger may provide either an AC or DC waveform. Power supplies of the respective types providing either of these waveforms have certain advantages to recommend their use in reproduction apparatus. An AC waveform power supply provides longevity of the associated charger to maintain a uniform charge, and results in the charger exhibiting a high resistance to airborne contaminants. However a DC waveform power supply operates at relatively lower peak voltages, thus reducing arcing and high voltage breakdown. It eliminates the need for large AC transformer (which produces a substantial quantity of heat, is prone to high voltage breakdown, and is substantial in size), is lower in cost and has a higher overall reliability.

SUMMARY OF THE INVENTION

In view of the foregoing discussion, this invention is directed to a power supply adapted for use with a corona charger, which enables one to achieve the desired effects of charging utilizing an AC power supply while actually utilizing two DC power supplies. The power supply includes a first DC power source providing an electrical potential above a predetermined reference potential, and a second DC power source providing an electrical potential below such predetermined reference potential. A main circuit having an output adapted to be connected to a corona charger, includes a switching circuit for selectively turning the first and second DC power sources on and off in a manner so as to provide a an electrical potential having an AC waveform output for the main circuit.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
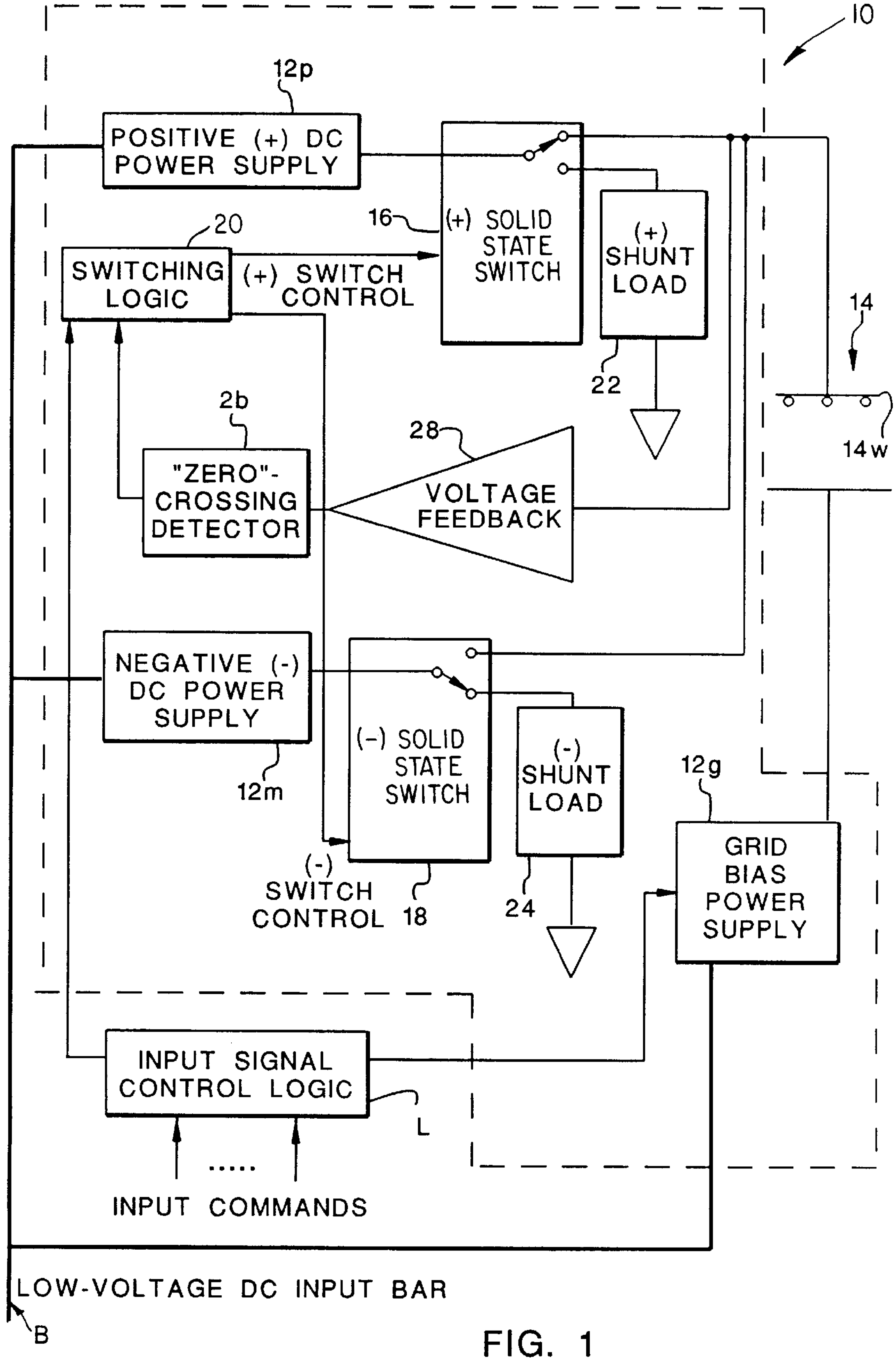
FIG. 1 is a schematic diagram of a corona charger and a bipolar duty cycle controllable DC corona power supply circuit according to this invention.

Referring now to the accompanying drawings, FIG. 1 schematically shows a bipolar duty cycle controllable DC corona power supply circuit, designated generally by the numeral 10, for a corona charger 14 of well known configuration. During use of the corona charger 14, the power supply circuit 10 enables the achievement of the desired effects of charging utilizing an AC power supply while actually utilizing two DC power supplies. The desired effects of AC charging, as discussed above, are increased charger longevity with increased charge uniformity, as well as resistance to airborne contaminates. According to this invention, two DC power supplies 12*p* and 12*n* operate in tandem to produce alternate portions of the AC cycle. The DC power supplies are of course easier to manufacture, smaller in physical size, and lower in cost (due in part to economies of scale) than AC supplies.

The input to the power supplies 12*p*, 12*n* is from a low voltage input bus B. The power supplies are selectively connected to the corona wires 14*w* of a corona charger 14 through respective switches 16, 18. The input bus B is also connected to a grid bias power supply 12*g* for the control grid 14*g* of the corona charger 14. A logic and control unit L is provided to establish predetermined time and/or voltage parameters (as discussed below) via digital or analog control commands. The logic and control unit L includes, for example, microprocessor receiving operator-selected input signals and machine-generated timing signals. Based on such signals and a program for the microprocessor, the logic and control unit L produces signals to control switching logic 20 for the switches 16,18 and the grid bias power supply 12*g*. The production of a program for a number of commercially available microprocessors is a conventional skill well understood in the art. The particular details of any such program would, of course, depend on the architecture of the designated microprocessor.

The operative states of the respective switches 16,18 are controlled by the switching logic 20. For example, in an operative cycle for the corona charger 14, the switching logic 20 first sets the switch 16 in an "on" state which enables the positive electrical potential from the supply 12*p* to apply a positive electrical potential of predetermined value $V_{b+}$ to the wires 14*w* of the corona charger 14. As shown in the waveform plot of FIG. 2, based on the characteristics of the power supply 12*p*, the positive electrical potential from the power supply 12*p* will rise over a time $t_{r+}$ to the predetermined value $V_{b+}$, and remain at that value for a given operating time $t_{on+}$. Thereafter, the switch 16 is set by the switching logic 20 to an "off" state where the electrical potential is applied through a shunt load 22 to ground. When the switch 16 is set in the "off" state, the electrical potential at the corona wires 14*w* falls to zero over a time $t_{f+}$.

At a predetermined subsequent time, the switching logic 20 sets the switch 18 in an "on" state which enables the negative electrical potential from the supply 12*n* to apply a negative electrical potential of predetermined value $V_{b-}$ to the corona wires 14*w*. As shown in the waveform plot of FIG. 3, based on the characteristics of the power supply 12*n*, the negative electrical potential from the power supply 12*n* will rise over a time $t_{r-}$ to the predetermined value $V_{b-}$, and remain at that value for a given operating time $t_{on-}$. Thereafter, the switch 18 is set by the switching logic 20 to an "off" state where the electrical potential is applied through a shunt load 24 to ground. When the switch 18 is set in the "off" state, the electrical potential at the corona wires 14*w* falls to zero over a time $t_{f-}$. This operative cycle is repeated for as long as it is desired to maintain the corona charger 14 in the operative state.

Figure 2:
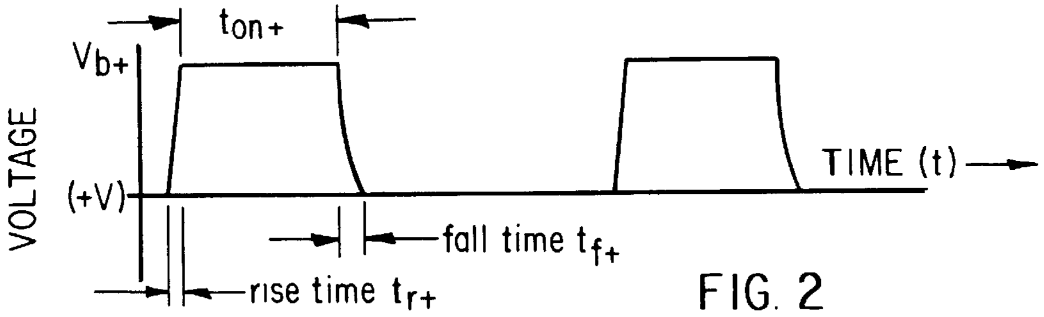
FIG. 2 is a plot of the waveform generated by the positive portion of the bipolar duty cycle controllable DC corona power supply of FIG. 1.
Figure 3:
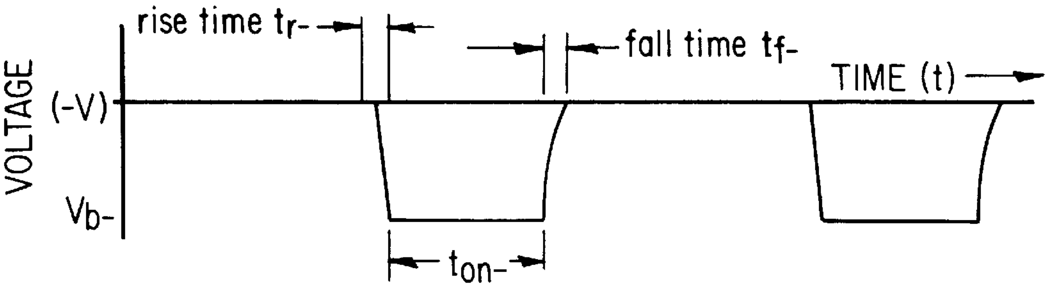
FIG. 3 is a plot of the waveform generated by the negative portion of the bipolar duty cycle controllable DC corona power supply of FIG. 1.
Figure 4:
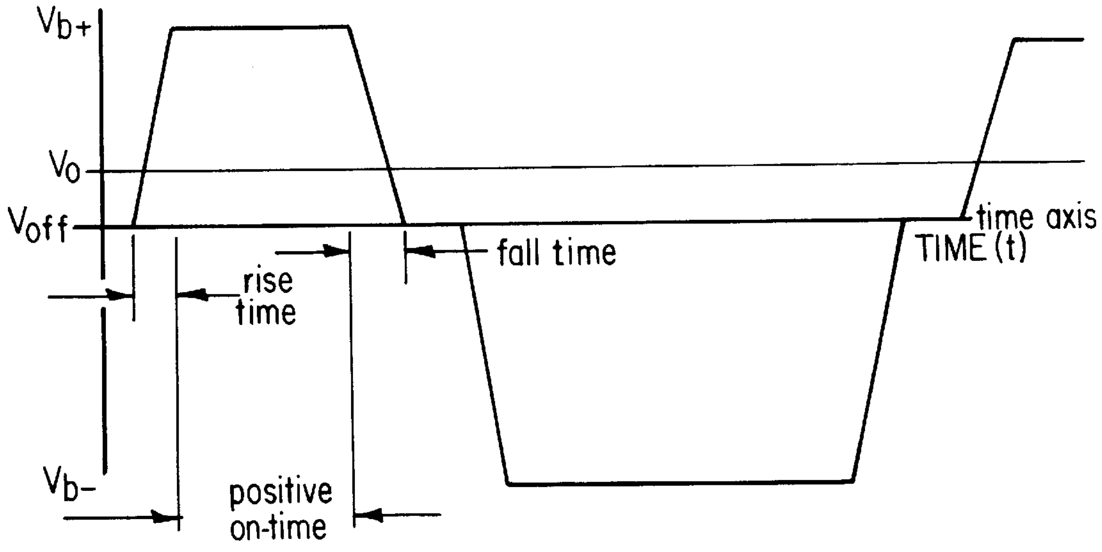
FIG. 4 is a plot of the combined waveform generated by the positive and negative portions of the bipolar duty cycle controllable DC corona power supply of FIG. 1.

The described operation cycle for the bipolar duty cycle controllable DC corona power supply circuit 10, according to this invention, results in the formation of a composite waveform as shown in FIG. 4 of the individual waveform plots shown in FIGS. 2 and 3. As can be seen, such composite waveform plot represents a rough approximation of an AC waveform. In the exemplary composite waveform plot as shown, the negative portion of the "AC" cycle has a longer $t_{on}$ time than does the positive portion. The voltage $V_{off}$ shown in FIG. 4 is the bias voltage imposed on the grid 14*g* of the corona charger 14. The value of either the positive or the negative portion of the waveform can be offset from a voltage $V_0$ (zero volts) by the value $V_b$ of the grid bias voltage. The offset could also become zero volts if it is desirable to do so. As noted above, the setting of the voltage $V_{off}$ and the voltage $V_b$ is controlled by the logic and control unit L.

Referring back to FIG. 1, the circuit 10 includes a "zero"-crossing detector 26. The detector 26 is coupled to an electrical potential feedback operational amplifier 28. As such, based on the feedback signal from the operational amplifier 28, the detector 26 can determine when the electrical potential from one power supply, applied to the corona wires 14*w*, after shut off falls to "zero". When the electrical potential from such one power supply falls to "zero", an output signal is produced by the detector 26, and such signal is applied to the switching logic 20 to enable the logic to set the switch for the other power supply to "on". This inhibits the switching logic 20 from attempting to set both power supplies 12*p*, 12*n*, to "on" at the same time.

The control signals to the bipolar duty cycle controllable DC corona power supply circuit 10 from the logic and control unit L are used to establish any of the time and/or voltage parameters via digital or analog control commands. The waveform modifications available from analog control commands are useful for maintaining excellent charge uniformity, and for allowing changes in charging to implement process control as specifically desired. It should also be noted that the method of utilizing two separate power supplies allows the system to maintain the corona a steady positive or negative value if necessary to aid in cleaning the device.

The invention has been described in detail with particular reference to preferred embodiments thereof, but it will be understood that variations and modifications can be effected within the spirit and scope of the invention as set forth in the claims.

What is claimed is:

1. A power supply adapted for use with a corona charger, said power supply comprising:

a first DC power source providing an electrical potential above a predetermined reference potential;

a separate second DC power source providing an electrical potential below said predetermined reference potential;

a power supply circuit having an output adapted to be connected to a corona charger, said circuit including a switching circuit for selectively turning said first and second DC power sources on and off in a manner so as to provide a an electrical potential having an AC waveform output for said power supply circuit, and a blocking circuit effective to prevent said first and second DC power sources from being turned on at the same time.

2. The power supply according to claim 1 wherein said power supply circuit includes a second electrical potential output, at said predetermined reference potential, adapted to be applied to the grid of a corona charger.

3. The power supply according to claim 1 wherein said predetermined reference potential is zero potential.

4. The power supply according to claim 1 wherein said predetermined reference potential is offset from zero potential.

5. The power supply according to claim 1 wherein said power supply circuit includes means for establishing different length on times for said first and second DC power sources.

6. A corona charger, for use with a reproduction apparatus or the like, including a power supply, said power supply comprising:

a first DC power source providing a positive electrical potential relative to a predetermined reference potential;

a separate second DC power source providing a negative electrical potential relative to said predetermined reference potential;

a power supply circuit having an output adapted to be connected to a corona charger, said circuit including a switching circuit for selectively turning said first and second DC power sources on and off in a manner so as to provide a an electrical potential having an AC waveform output for said power supply circuit, and a blocking circuit effective to prevent said first and second DC power sources from being turned on at the same time.

7. The power supply according to claim 6 wherein said power supply circuit includes a second electrical potential output, at said predetermined reference potential, adapted to be applied to the grid of a corona charger.

8. The power supply according to claim 6 wherein said power supply circuit includes means for establishing different length on times for said first and second DC power sources.

* * * * *